United States Patent
Ueda et al.

(10) Patent No.: US 6,233,037 B1
(45) Date of Patent: *May 15, 2001

(54) IMAGE FRAME SELECTOR SYSTEM FOR A PHOTOGRAPHIC PRINTING APPARATUS

(75) Inventors: Shigeki Ueda, Izumisano; Atsushi Nagamatsu, Wakayama-ken; Masayuki Taniguchi, Wakayama, all of (JP)

(73) Assignee: Noritsu Koki Co. LTD, Wakayama-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,739

(22) Filed: Feb. 17, 1998

(30) Foreign Application Priority Data

Feb. 18, 1997 (JP) .................................................. 9-033522
Nov. 10, 1997 (JP) .................................................. 9-306899

(51) Int. Cl.[7] .......................... G03B 27/52; G03B 27/72; G03B 27/80; G03F 3/10
(52) U.S. Cl. ............................... 355/40; 355/38; 355/35; 358/527
(58) Field of Search ................................. 355/40, 41, 27, 355/28, 54, 38, 35; 358/527; 396/424; 348/64, 65, 440

(56) References Cited

U.S. PATENT DOCUMENTS

| 4,491,874 |   | 1/1985  | Yamamoto . |
|-----------|---|---------|-----------|
| 4,736,256 |   | 4/1988  | Ichikawa . |
| 4,994,850 |   | 2/1991  | Imamura et al. . |
| 5,477,353 |   | 12/1995 | Yamasaki . |
| 5,671,072 | * | 9/1997  | Umemoto ............................ 358/527 |
| 5,710,954 | * | 1/1998  | Inoue ................................. 355/41 |
| 5,745,220 | * | 4/1998  | Okazaki et al. ...................... 355/54 |
| 5,822,040 | * | 10/1998 | Sugahara et al. ..................... 355/38 |
| 5,845,166 | * | 12/1998 | Fellegara et al. ..................... 348/64 |

FOREIGN PATENT DOCUMENTS

| 0724189 | 7/1996 | (EP) | ............................. G03B/27/46 |
| 2103027 | 4/1990 | (JP) | ............................. G03B/27/46 |

* cited by examiner

Primary Examiner—Russell Adams
Assistant Examiner—Peter B. Kim
(74) Attorney, Agent, or Firm—Fulbright & Jaworski, LLP

(57) ABSTRACT

An image frame selector system for a photographic printing apparatus includes an image processing unit (5d) for reading image frames from a photographic film (2) and displaying a plurality of simulated image frames in a particular multiple frame display pattern on a monitor (50), and a keyboard (60) for inputting commands to handle the simulated image frames displayed. The monitor is switched to a view including next simulated image frames unless commands are inputted through the keyboard within a predetermined time.

5 Claims, 14 Drawing Sheets

E.C.C.U. = exposing condition computing unit

IMAGE FRAME SELECTOR SYSTEM FOR A PHOTOGRAPHIC PRINTING APPARATUS

BACKGROUND OF THE INVENTION

Field of the Invention

This invention relates to an image frame selector system for a photographic printing apparatus for selecting a particular simulated image frame from among a plurality of simulated image frames displayed on a monitor screen.

Description of the Related Art

The photographic printing apparatus makes prints by exposing developed image frames of photographic film on printing paper. The printing operation requires the steps of selecting image frames to be printed, correcting exposing conditions, and inputting the number of prints. In particular, the step of selecting image frames must be carried out frequently. For printing image frames of photographic film on printing paper, the photographic printing apparatus recognizes reference positions for the image frames of the photographic film with an optical sensor, for example. A transport mechanism sets the image frames to be printed to a printing opening disposed in an intermediate position on a film transport path. Then, a required number of each frame is printed on printing paper with exposing conditions corrected as necessary. Various methods of selecting image frames to be printed are known today.

Japanese Patent Laying-Open Publication H2-103027 discloses one such method. The technique disclosed therein provides selector keys corresponding in number and arrangement to image frames formed on piece film. When selecting image frames to be printed from the piece film, the selector keys are used for collation with the positions of the image frames to be selected. According to the conventional technique, the selector keys are arranged in a corresponding relationship to the image frames on the piece film. This enables an improved selecting efficiency where the positions on the piece film of the image frames to be selected are known. However, if the positions on the piece film of the image frames to be selected are uncertain, the operator must detach the piece film from a negative carrier once, in order to look closely at the piece film and confirm the positions.

Further, in a method employed for selecting image frames while visually confirming the image frames, a scanner disposed on a film transport path reads image frames, and resulting image signals are processed for display on a monitor. A cursor also displayed on the monitor is moved by operating cursor keys to select the simulated image frames. However, it is a troublesome operation for a skilled operator to move the cursor successively with the cursor keys. Where a pointing device such as a mouse or touch panel is used in place of the cursor keys, the selecting operation may be easy to an unskilled operator. However, a skilled operator attempting to select simulated image frames promptly would feel that a long time is taken to move from one simulated image frame to another, remote image frame. Moreover, it may be contrary to simplification and low cost of the photographic printing apparatus to provide a pointing device such as a mouse or touch panel besides input keys on a keyboard for operating the apparatus.

The prior art noted above may contribute to some extent toward a reduction of errors in selecting image frames. However, the operation to feed image frames successively by operating the keys remains troublesome. Certain image frames may require a manual operation to vary exposing conditions automatically set in time of simultaneous printing. Less than 10 such image frames may occur on a photographic film of 36 exposures. It is therefore undesirable from the viewpoint of operating efficiency to feed image frames by operating the keys even when no correction is required.

SUMMARY OF THE INVENTION

The object of this invention is to overcome the disadvantages of the prior art noted above, and to provide an image frame selector system for a photographic printing apparatus which enables an efficient operation to check whether image frames require correction or not while visually confirming the image frames.

The above object is fulfilled, according to this invention, by an image frame selector system for a photographic printing apparatus comprising image processing means for successively displaying a plurality of simulated image frames in a particular multiple frame display pattern on a monitor screen, the simulated image frames representing images read from image frames on photographic film in one unit, input means for inputting commands to manipulate the simulated image frames displayed on the monitor screen, and screen display change means for switching the monitor screen to a view including next simulated image frames unless the commands are inputted through the input means within a predetermined time.

With this construction, unless commands such as for correcting exposing conditions are applied to the simulated image frames displayed on the monitor, next simulated image frames are automatically displayed upon lapse of a predetermined time after the first simulated image frames are put on display. Thus, the operator may concentrate on the monitor screen, to achieve improved working efficiency.

With regard to monitor display switching, i.e. rewriting on the monitor screen, one preferred embodiment of this invention provides that the screen display change means is operable, unless the commands are inputted through the input means within a predetermined time, to move the simulated image frames page by page, thereby to eliminate all of these simulated image frames from the monitor screen and to display next simulated image frames corresponding in number to the multiple frame display pattern. That is, the monitor screen is rewritten in units of the number corresponding to the multiple frame display pattern. Since display switching is made page by page, with each page presenting a plurality of simulated image frames, fatigue of the operator's eyes is alleviated, compared with the case of rewriting on the screen in units of image frame.

It is of course possible, unless the commands are inputted within a predetermined time, to scroll the simulated image frames frame by frame on the monitor screen, thereby to eliminate a leading one (usually at the right end) of the simulated image frames and additionally display a new simulated image frame (usually at the left end). This mode provides an advantage of allowing the operator to observe successively the images formed on photographic film in one order. This facilitates checking by the operator whether the exposing conditions should be corrected or not.

As noted above, typical monitor screen rewriting modes include a page moving mode and a scroll mode. A selection between these modes may be made as the operator pleases. In a preferred embodiment of this invention, the predetermined time set to one of the automatic monitor screen rewriting modes to determine timing of the monitor screen rewriting is automatically adjustable to the other automatic monitor screen rewriting mode. The predetermined time need not be adjusted every time the automatic monitor screen rewriting modes are switched as necessary.

In a further preferred embodiment of this invention, a plurality of multiple frame display patterns are made available, and the first predetermined time and the second predetermined time set for a standard one of the multiple frame display patterns are automatically adjustable according to the number of frames displayed in a selected one of the multiple frame display patterns. The predetermined time for determining timing of the monitor screen rewriting may be set as desired. Where a plurality of multiple frame display patterns are available for displaying different numbers of image frames, as in this construction, the predetermined times are adjustable according to the number of frames displayed in a selected multiple frame display pattern. For example, where four seconds are set to a four-frame display pattern, six seconds are set to a six-frame display pattern. Thus, the predetermined times need not be adjusted every time the multiple frame display patterns are switched as necessary.

An optimal predetermined time for determining timing of monitor screen rewriting is variable with the operator's skill level. It will therefore be advantageous if the predetermined time is set according to the operator's skill level. Assume, for example, that the operator's skill is graded from 1 to 5. By inputting one of these grades, a period of time until monitor screen rewriting may be set automatically.

In a further embodiment of this invention, the predetermined time includes a first predetermined time effective for a first monitor screen view displaying the simulated image frames in the one unit, and a second predetermined time effective for monitor screen views subsequent to the first monitor screen view, the first predetermined time and the second predetermined time being separately settable. With this construction, unless commands such as for correcting exposing conditions are applied to the simulated image frames displayed on the monitor screen, next simulated image frames are automatically displayed upon lapse of a predetermined time. The time for automatic monitor screen rewriting for the first monitor screen view showing the simulated image frames in one unit is set separately from the time for automatic monitor screen rewriting for subsequent monitor screen views. It is thus possible to extend only the time for monitor screen rewriting of the first monitor screen view. A printing operation is carried out for photographic film in each unit (which usually corresponds to one film and may be called one order since this is a basic unit of order by customers, though in this invention not limited to one order). Finished prints are collated and put into a packet during a period after completion of checking of simulated image frames in one order and before a start of checking of simulated image frames in a next order. After it is notified by buzzer or other means that a first monitor screen view is displayed for simulated image frames in an order processed, checking is made of the simulated image frames. Thus, the checking of the first simulated image frames is slower than the checking of simulated image frames subsequently displayed on the monitor screen. Taking this fact into account, a significant advantage is provided by the feature noted above that the first predetermined time and second predetermined time may be set separately. Of course, the first predetermined time and second predetermined time may be set equal where the operation to check simulated image frames and the collating and packing operation are carried out by different operators. In any case, screen rewriting is carried out automatically upon lapse of a predetermined time, which allows the operator to concentrate on the monitor screen, to achieve improved operating efficiency.

In the above preferred embodiment, the first predetermined time may be equalized to the second predetermined time when the first predetermined time set proves shorter than the second predetermined time set separately therefrom. This feature is effective to avoid a contradiction that the second predetermined time becomes longer than the first predetermined time.

In a preferred embodiment of this invention, the input means includes a plurality of selector keys arranged in a corresponding relationship to an arrangement of the simulated image frames displayed in the multiple frame display pattern on the monitor screen, a function for selecting the simulated image frames displayed on the monitor screen being assigned only to the selector keys corresponding to the arrangement of the simulated image frames in the multiple frame display pattern. With this construction, A desired one of simulated image frames displayed in a set multiple frame display pattern on the monitor may be selected by operating a selector key in a position corresponding to the desired image frame currently displayed. Further, even if the multiple frame display pattern is changed, the selecting function assigned to the selector keys may also be changed so as to correspond to different positions of the simulated image frames. An operation to select simulated image frames may be carried out with selector keys in positions corresponding to the simulated image frames displayed in any multiple frame display pattern on the monitor. Consequently, a simulated image frame selecting operation may be carried out promptly by using a group of selector keys corresponding to the arrangement of the simulated image frames displayed on the monitor.

Other features and advantages of this invention will be apparent from the following description of the embodiments to be taken with conjunction with the drawings.

DESCRIPTION OF THE PREFERRED EMBODIMENTS

Figure 1:
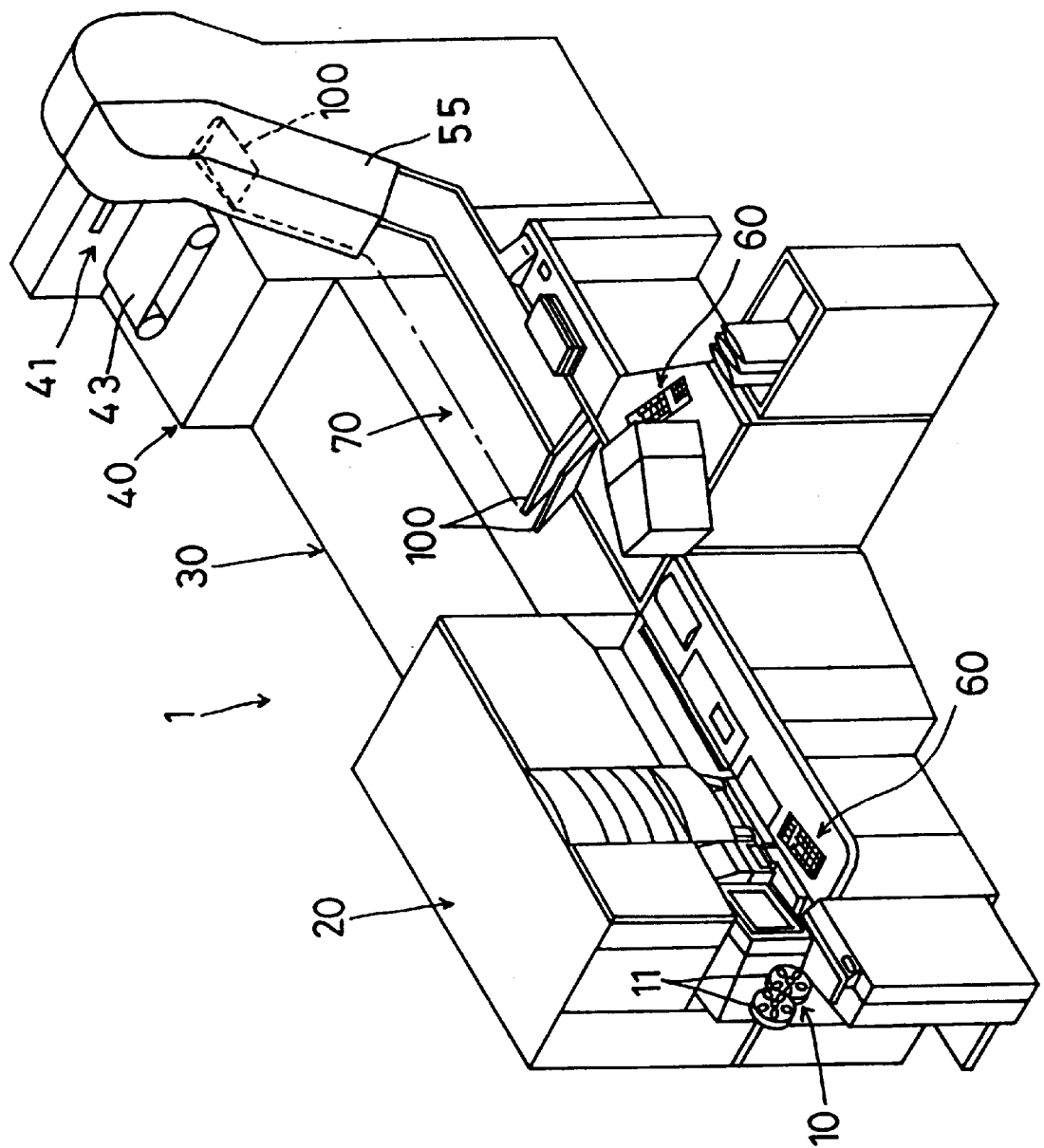
FIG. 1 is a perspective view of a photographic printing apparatus employing an image frame selector system according to this invention.
Figure 2:
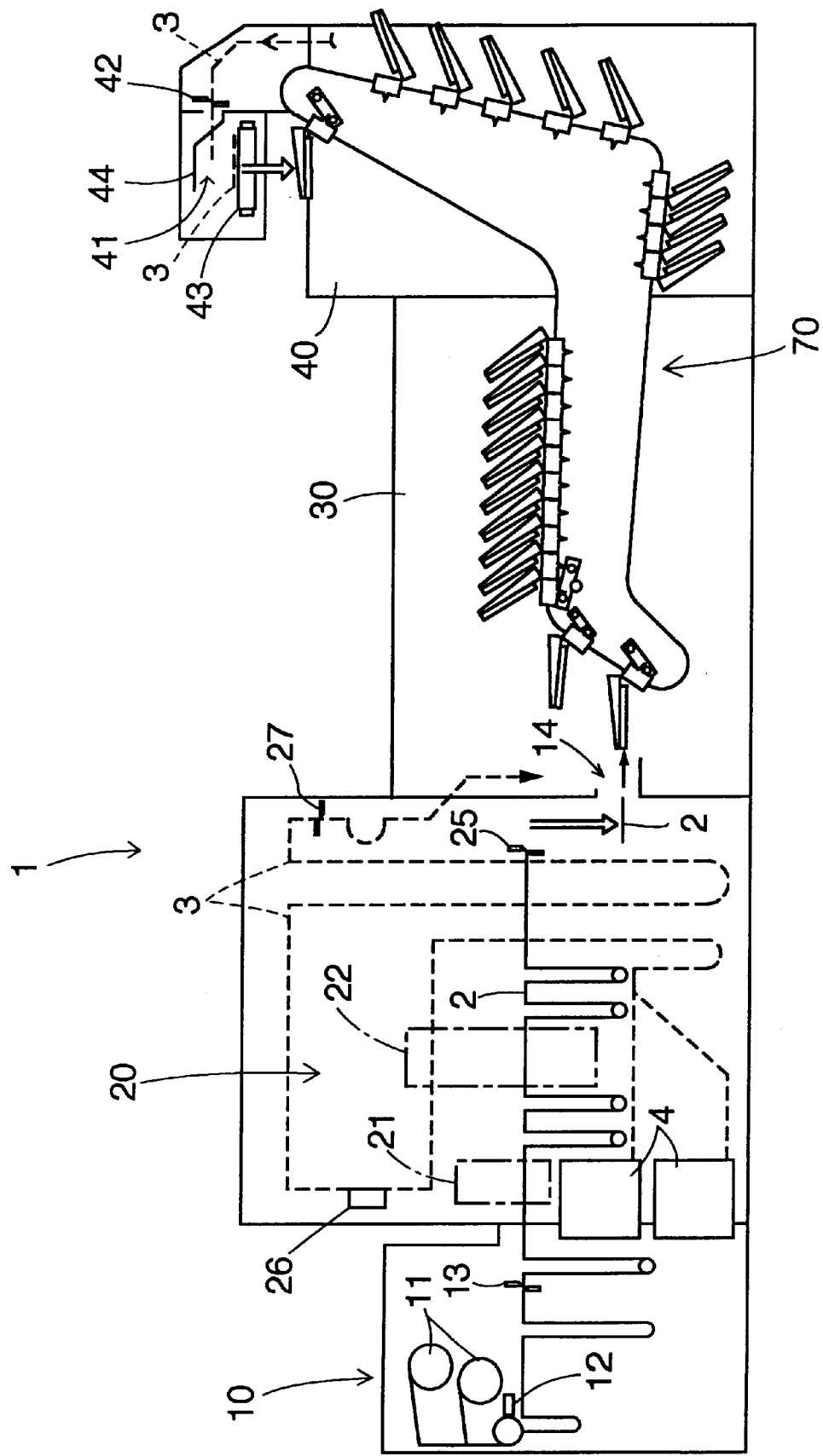
FIG. 2 is a schematic view of the photographic processing apparatus of FIG. 1, showing flows of negative film and printing paper.

FIG. 1 shows an entire photographic processing apparatus 1 employing an image frame selector system according to this invention. FIG. 2 schematically shows transport paths of a negative film 2 (the term negative film being used herein to refer collectively to a negative film having a length of one photographic film, cut piece negatives each having several frames, and a negative film in a cartridge designed for an advanced photo system) and printing paper 3 undergoing varied processes in the photographic processing apparatus 1. This photographic processing apparatus 1 includes a negative film feeder 10, an exposing station 20 for printing images of the negative film 2 on the printing paper 3 drawn from a paper magazine 4, a developing station 30 for developing the exposed printing paper 3, a drying station 40 for drying the developed printing paper 3, a print outlet 41 for cutting and discharging the dried printing paper 3 in predetermined lengths as prints, a negative film outlet 14 for cutting and discharging the negative film 2 used in the exposing station 20, with negative sheets inserted as necessary, and a tray conveyer 70 for collating and combining, as a finished product, the cut negative films 2 in one order received from the negative film outlet 14 and the prints in the one unit received from the print outlet 41, and transporting the finished product to a position for collection by the operator.

The negative film feeder 10 may be loaded with two negative reels 11 each having up to 100 negative films 2 connected by splicing tape. A bar-code reader 12 reads bar codes on the negative films 2 drawn from either negative reel 11. A negative cutter 13 cuts the negative films 2 order by order. The exposing station 20 carries out printing operations for the negative films 2 fed thereto order by order.

Figure 3:
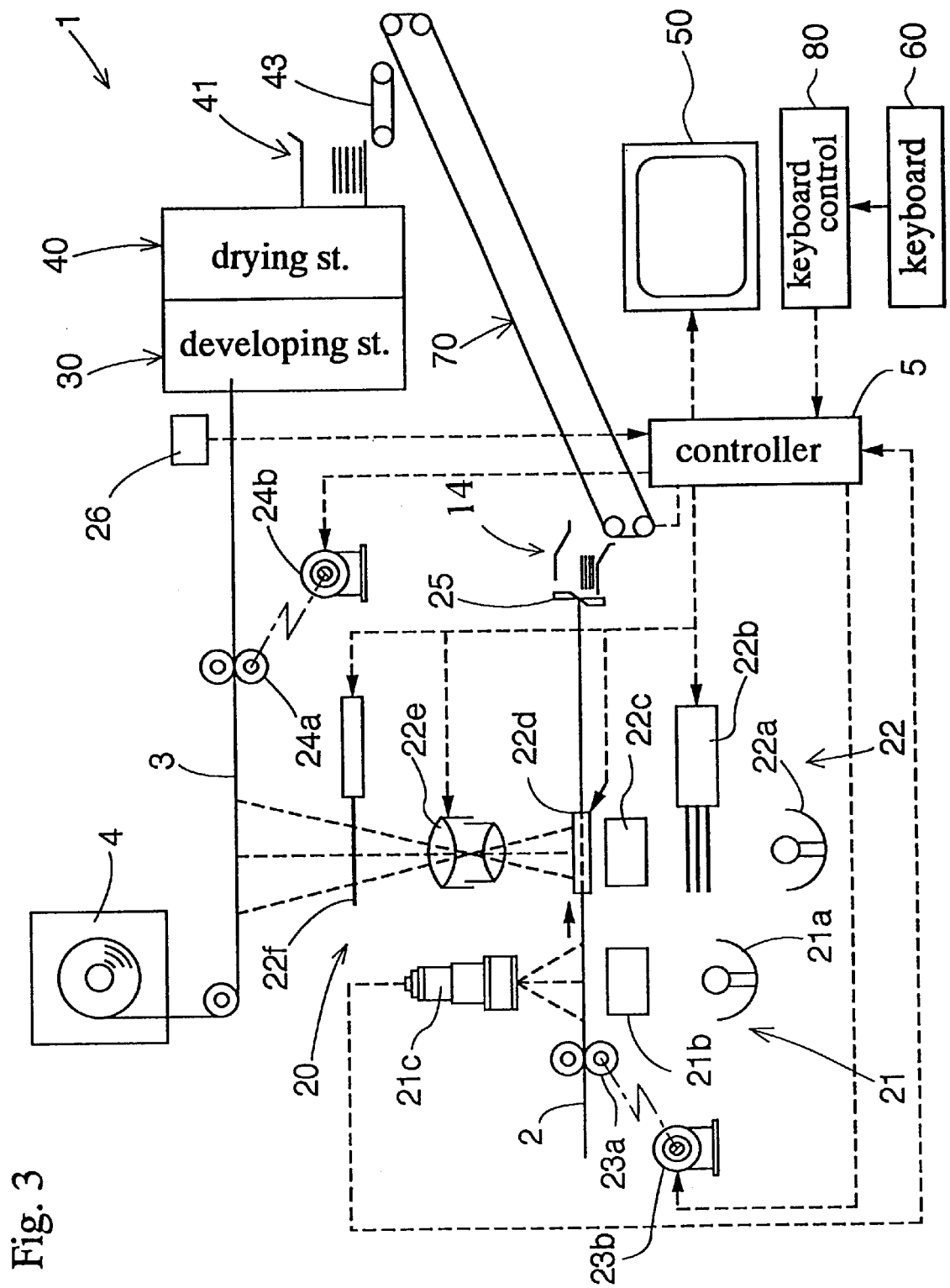
FIG. 3 is a block diagram of the photographic processing apparatus of FIG. 1.

As shown in FIG. 3 (in which the vertical arrangement of negative film 2 and printing paper 3 is inverted from FIG. 2), the exposing station 20 includes a film reader 21 disposed upstream with respect to a direction of film transport and having a reading light source 21a, a mirror tunnel 21b and an image pickup 21c, and an exposing device 22 disposed downstream with respect to the film transport direction and having an exposing light source 22a, a light adjustment filter 22b, a mirror tunnel 22c, a negative mask 22d, a printing lens 22e and a shutter 22f. Rollers 23a and a motor 23b for driving the rollers 23a are provided to transport the negative film 2 from the negative film feeder 10 through the exposing station 20 to the negative outlet 14.

First, the film reader 21 reads the image of each frame on the negative film 2 transported by the rollers 23a, and transmits image information to a controller 5 which controls the entire photographic printing apparatus 1. From the image information received from the film reader 21, the controller 5 derives exposing conditions for printing the images of the negative film 2 on the printing paper 3. The controller 5 controls the light adjustment filter 22b and shutter 22f based on the exposing conditions derived to expose the printing paper 3 when the corresponding frame on the negative film 2 arrives at the position of negative mask 22d. In addition, the controller 5 processes the image information of the negative film 2 read by the film reader 21, and causes a monitor 50 to display simulations of images to be printed on the printing paper 3 with the exposing conditions derived. The operator may observe the simulated images displayed on the monitor 50, and correct the exposing conditions through a keyboard 60 as necessary. The keyboard 60 is connected to the controller 5 through a keyboard control unit 80 described hereinafter.

The negative film 2 emerging from the exposing station 20 is cut to a plurality of negative pieces 2 each having six or four frames by a negative cutter 25 in the negative outlet 14 disposed downstream of the exposing device 22 with respect to the film transport direction. The negative pieces 2 are delivered to the tray conveyer 70. Depending on specifications, the negative pieces 2 may be inserted into negative sheets by a negative inserter not shown, the negative sheets being folded before delivery to the conveyer 70. The negative film 2 designed for an advanced photo system is drawn out of the cartridge before the varied processes, and rewound into the cartridge again after the processes. This type of negative film 2 after the exposing process is delivered to the tray conveyer 70 as contained in the cartridge.

The developing station 30 includes a plurality of developing tanks not shown. The printing paper 3, with the images of the negative film 2 printed thereon in the exposing station 20, is transported by rollers 24a and a motor 24b for driving the rollers 24a, through a correction print unit 26, and successively through the developing tanks in the developing station 30 to be developed. A cutter 27 is disposed upstream of the developing station 30 for cutting the printing paper 3 in an emergency, e.g. when the printing paper 3 cannot be fed from the exposing station 20 to the developing station 30 despite the presence of a loop.

The developed printing paper 3 is dried in the drying station 40 and forwarded to the print outlet 41, where the paper 3 is cut by a paper cutter 42 to become finished prints 3. The prints 3 are delivered by a transverse conveyer 43 to the tray conveyer 70. Numeral 44 denotes a printing paper bypass for discharging the printing paper 3 without being cut when the printing paper 3 cannot be delivered to the tray conveyer 70 owing to some trouble.

Figure 4:
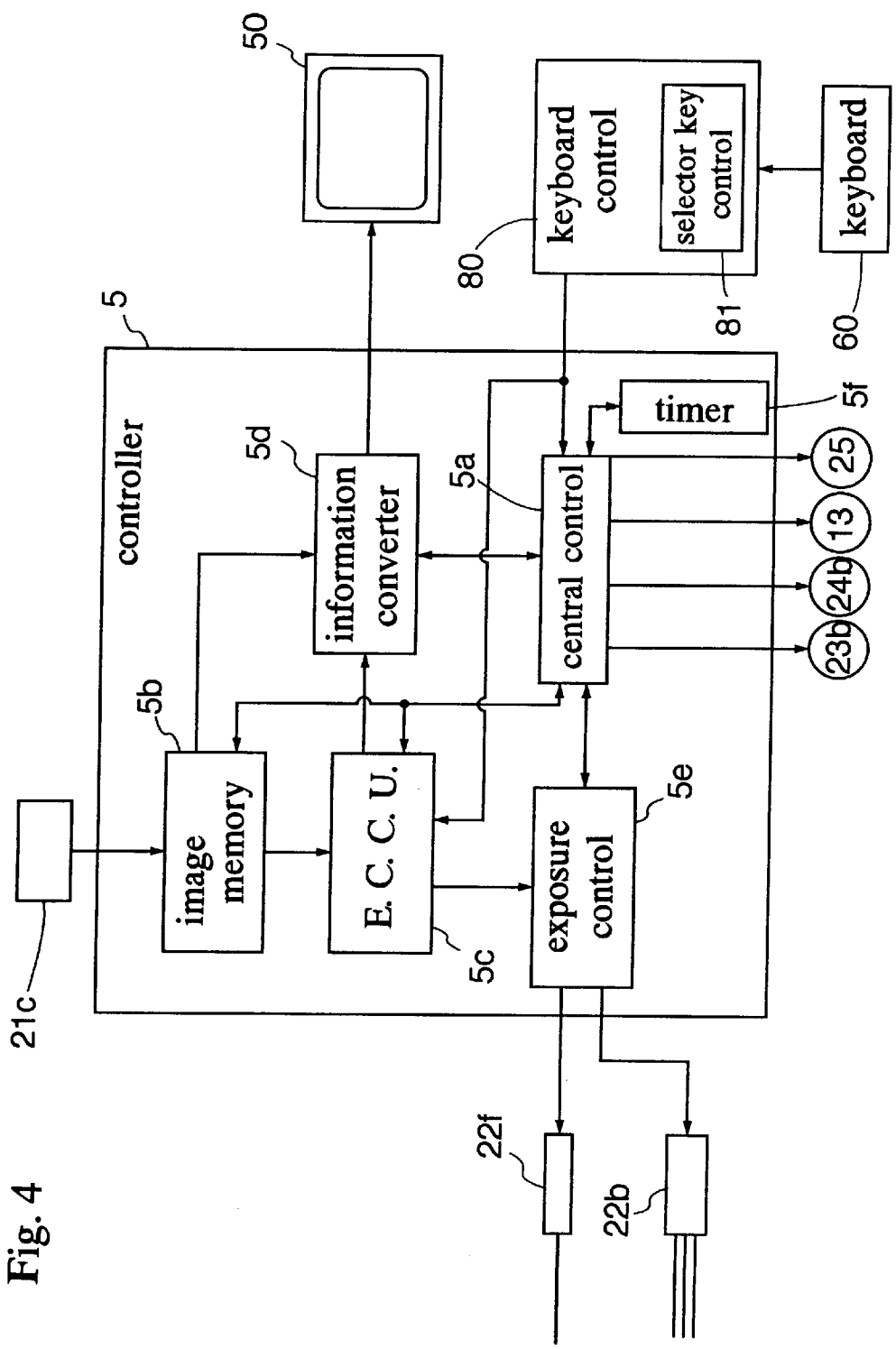
FIG. 4 is a block diagram of a controller.

As shown in FIG. 4, the controller 5 includes an image information memory 5b for storing image data read by the image pickup 21c, an exposing condition computing unit 5c for deriving exposing conditions from the image data in the image information memory 5b, an exposure control unit 5e for controlling the light adjustment filter 22b and shutter 22f of the exposing station 22 based on the exposing conditions derived by the exposing condition computing unit 5c to effect exposure on the printing paper 3, an image information converter 5d for converting the image data read from the image information memory 5b to image data for display on the monitor 50 based on the exposing conditions determined by the exposing condition computing unit 5c, and a central control unit 5a for controlling the image information memory 5b, exposing condition computing unit 5c, image information converter 5d and exposure control unit 5e based on a program stored and instructions inputted through the keyboard 60.

The image information converter 5d has various parameters registered therein for converting image information such as for negative-to-positive conversion. These parameters allow images equivalent to the images formed on the printing paper 3 by projecting the image frames of film 2 with exposing conditions determined by the exposing condition computing unit 5c, i.e. simulated image frames, to be displayed in a multiple frame display pattern, described hereinafter, on the monitor 50. The exposing condition computing unit 5c performs a correction of exposing conditions upon receipt of instructions from the keyboard 60 to vary an amount of exposure for each of colors Y (yellow), M (magenta) and C (cyan) or to effect average variations in the amount of exposure corresponding to density variations in the photographs.

The image information memory 5b has a storage capacity for storing image data read by the image pickup 21c from image frames on the film 2 in one order. The image information converter 5d may read the image data of a plurality of frames from the image information memory 5b and convert the image data. Consequently, a plurality of simulated image frames may be displayed simultaneously in a particular multiple frame display pattern on the monitor 50.

This photographic printing apparatus has a manual processing mode and an auto processing mode. In the manual processing mode, the operator observes simulated image frames displayed on the monitor 50, and determines whether the exposing conditions should be corrected or not. In the auto processing mode, a printing operation is carried out with exposing conditions derived by the exposing condition computing unit 5c, without a judgment made by the operator. When the manual processing mode is selected, simulated image frames are displayed in a particular multiple frame display pattern on the monitor 50. As shown in FIG. 4, a timer 5f is connected to the central control unit 5a. If there is no need to input commands such as correction commands for the simulated image frames displayed on the monitor 50, next simulated image frames are displayed upon lapse of a first predetermined period of time for a first monitor screen view of simulated image frames in one order, and upon lapse of a second predetermined period of time for subsequent monitor screen views. The timer 5f is provided by a program.

A period of time measured by the timer 5f for displaying next simulated image frames may be set through the keyboard 60. Where, for example, the first and second predetermined periods of time are set based on a four-frame display pattern, and when a different multiple frame display pattern is selected, the period of time is automatically extended to be the longer, the larger number of simulated image frames are displayed on the monitor 50.

The first and second predetermined periods are usually set by the operator at an appropriate time. It may be convenient if the first and second predetermined periods are set automatically according to a grade indicating the operator's skill level, for example. For this purpose, for example, grades 1 to 5 may be set to indicate the operators'skill levels. These grades may be inputted through the keyboard 60, whereby the central control unit 5a sets periods of time to the timer 5f. Further, the skill level of the operator may be recorded on his or her ID card or the like. Based on an input made from the ID card, parameters may be set which are variable according to the operator's skill level.

Figure 5:
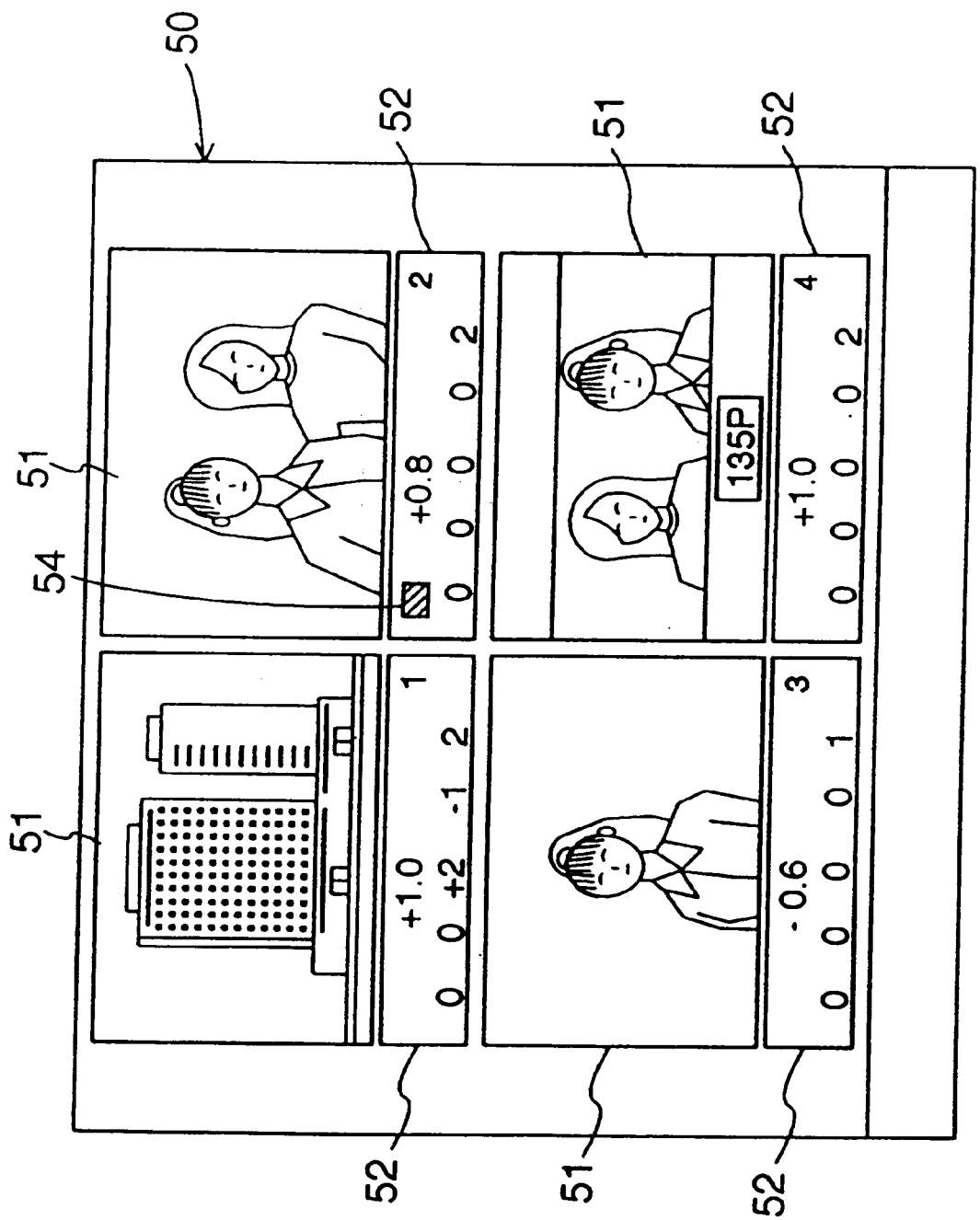
FIG. 5 is an explanatory view of a four-frame display pattern appearing on a monitor.
Figure 6:
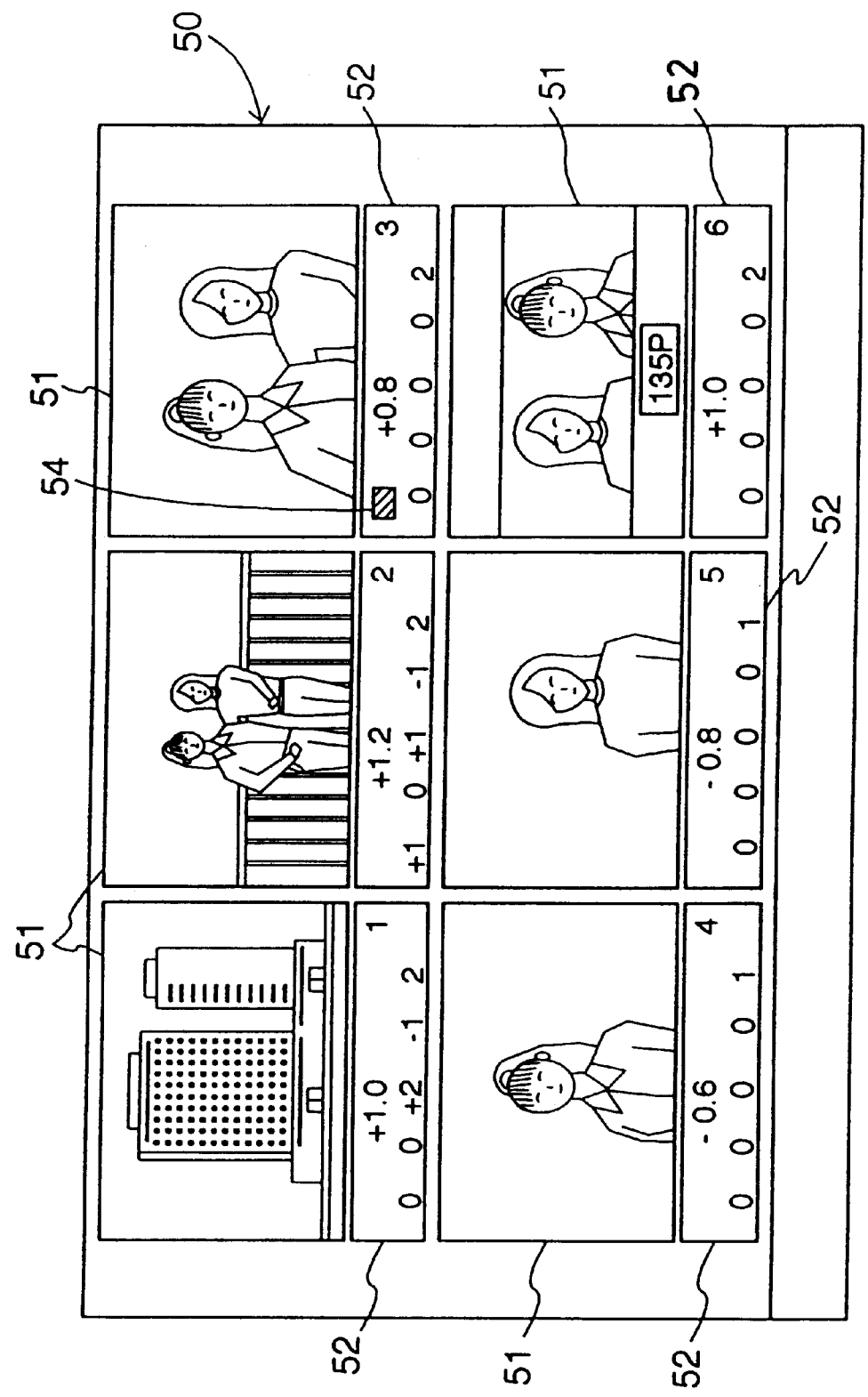
FIG. 6 is an explanatory view of a six-frame display pattern appearing on the monitor.
Figure 7:
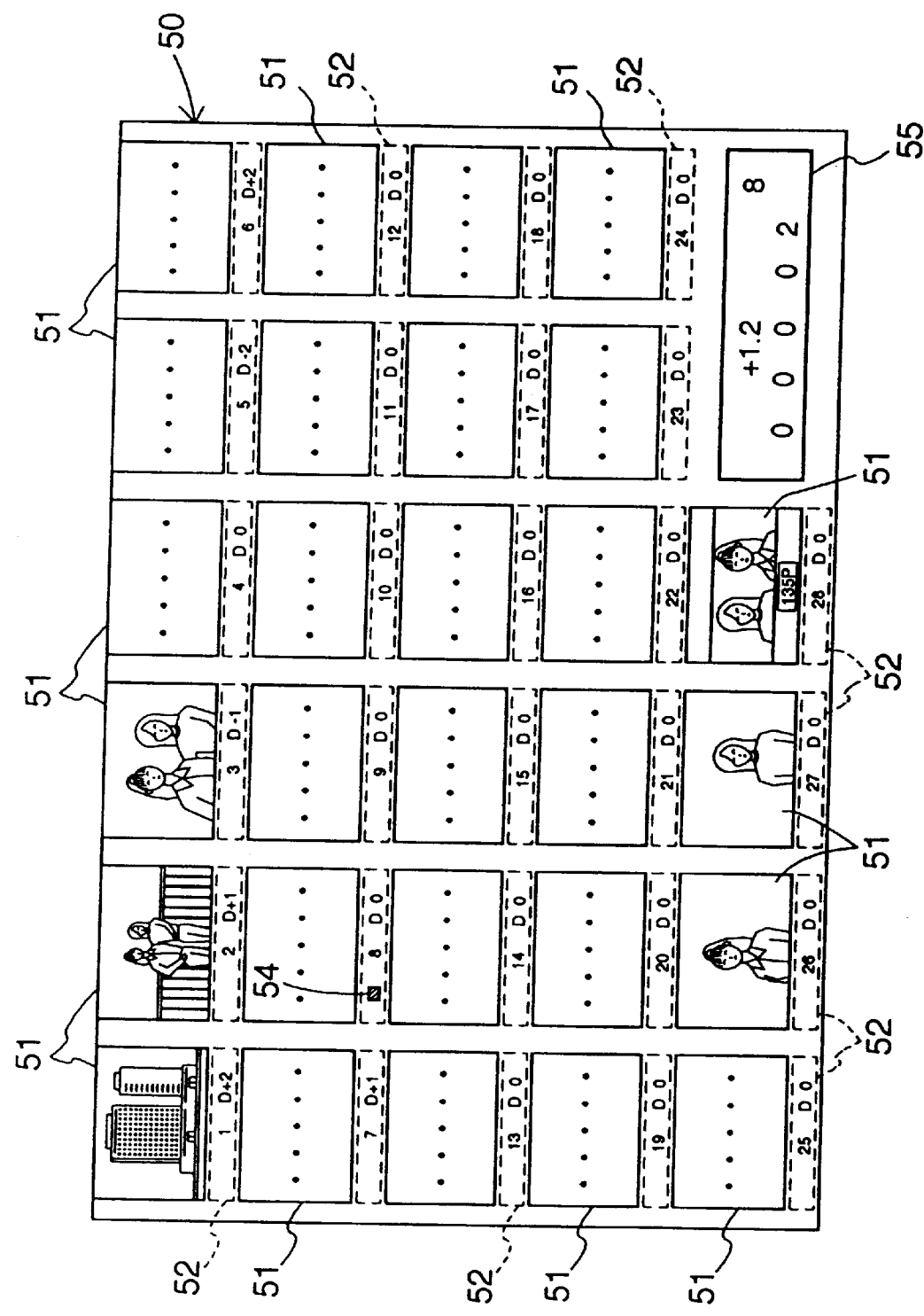
FIG. 7 is an explanatory view of a 28-frame display pattern appearing on the monitor.

Multiple frame display patterns for displaying a plurality of simulated image frames on the monitor 50 include a four-frame display pattern for displaying four simulated image frames 51 as shown in FIG. 5, a six-frame display pattern for displaying six simulated image frames 51 as shown in FIG. 6, a 28-frame display pattern for displaying 28 simulated image frames 51 as shown in FIG. 7, and a 40-frame display pattern for displaying 40 simulated image frames 51 though this pattern is not illustrated.

As will be understood from the above, the image information converter 5d is the main component of the image processing device for successively displaying images read from the image frames on the photographic film 2 in one unit, as a plurality of simulated image frames 51 in a particular multiple frame display pattern on the monitor screen. The central control unit 5a and timer 5f are the main components of the screen display changing device for switching the monitor screen to display next simulated image frames 51 when no command input is made within a predetermined period of time through the keyboard 60 acting as an input device.

Figure 8:
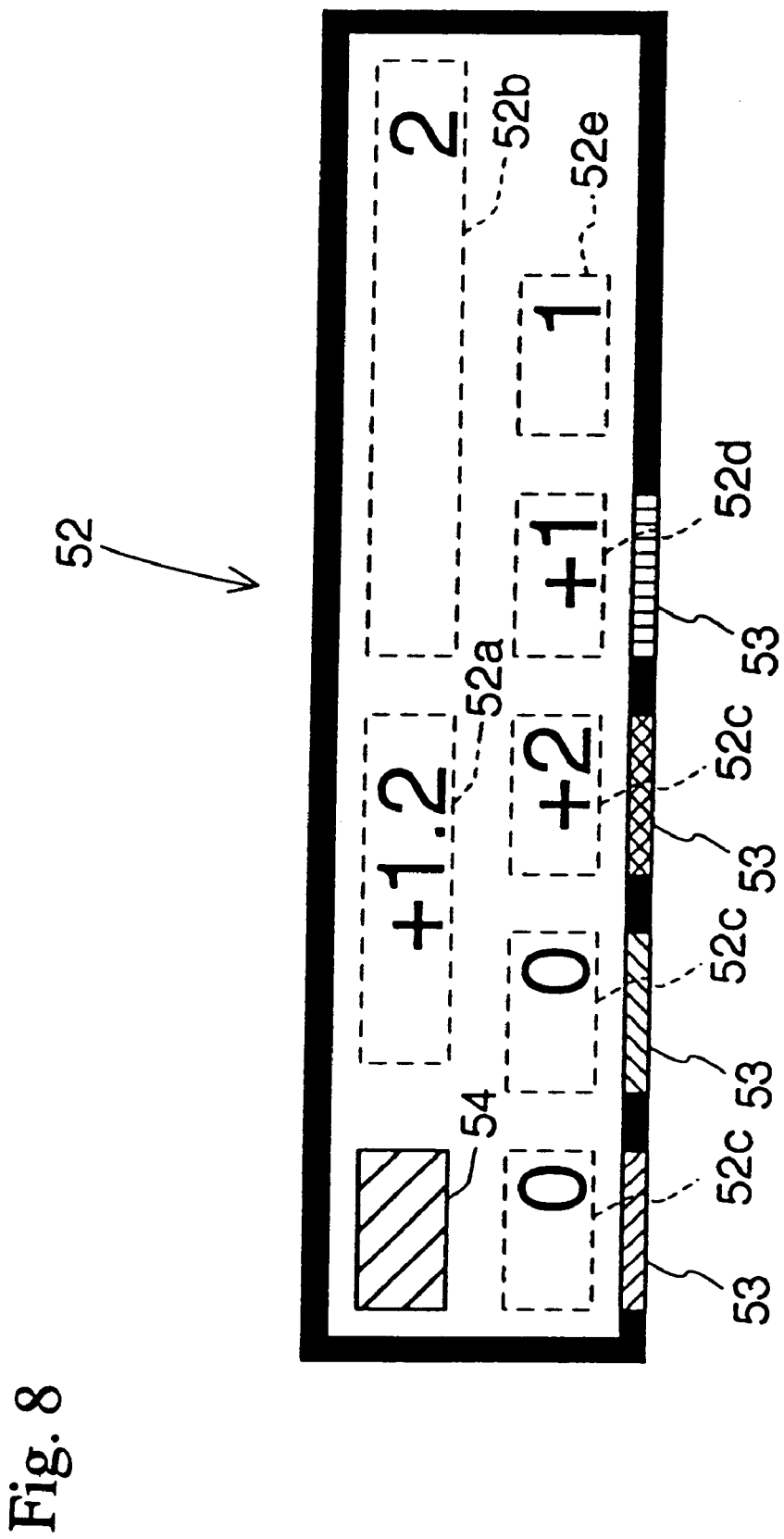
FIG. 8 is an explanatory view of a data display region in a multiple frame display pattern.

In the four-frame display pattern, four simulated image frames 51 are successively displayed in the order of arrangement on the film 2. A data display region 52 is disposed under each simulated image frame 51 as associated with this simulated image frame 51. As shown in FIG. 8, the data display region 52 includes a density display column 52a for displaying an average density value derived from photometric values provided by the film reader 21, a frame number display column 52b for displaying the frame number of each frame, correction value display columns 52c for displaying correction values inputted from the keyboard 60 for the respective colors of Y, M and C, a density key correction value display column 52d for displaying a correction command inputted from the keyboard 60 for an average variation in the amount of exposure corresponding to density variations in the photograph, and a number of prints display column 52e for displaying the number of prints to be made of the frame image inputted from the keyboard 60. Guide marks 53 in Y, M, C and white are displayed peripherally of the data display region 52.

Further, in this embodiment, a cursor 54 is displayed in the upper left corner of the data display region 52 to indicate that the simulated image frame is active to receive commands from the keyboard 60.

The cursor 54 may take various forms, such as a form surrounding part or whole of the simulated image frame made active.

As seen from a comparison between FIG. 5 and FIG. 6, the six-frame display pattern is similar to the four-frame display pattern.

Thus, the six-frame display pattern will not be described. Naturally, the simulated image frames 51 are displayed in a smaller size in this pattern than in the four-frame display pattern.

In the 28-frame display pattern, 28 simulated image frames 51 are successively displayed in the order of arrangement on the film 2.

As shown in FIG. 7, a data display region 52 disposed under each simulated image frame 51 for displaying a cursor 54 as well as the frame number and a correction value for an average variation in the amount of exposure corresponding to density variations in the photograph. Further, a data display region 55 is disposed in the lower right corner on the display screen of monitor 50, which is similar to the region 52 shown in FIG. 8. This data display region 52 of course does not display a cursor 54. The simulated image frame 51 appearing vertically reduced in size on the monitor 50 represents a photo taken in panorama size.

Figure 9:
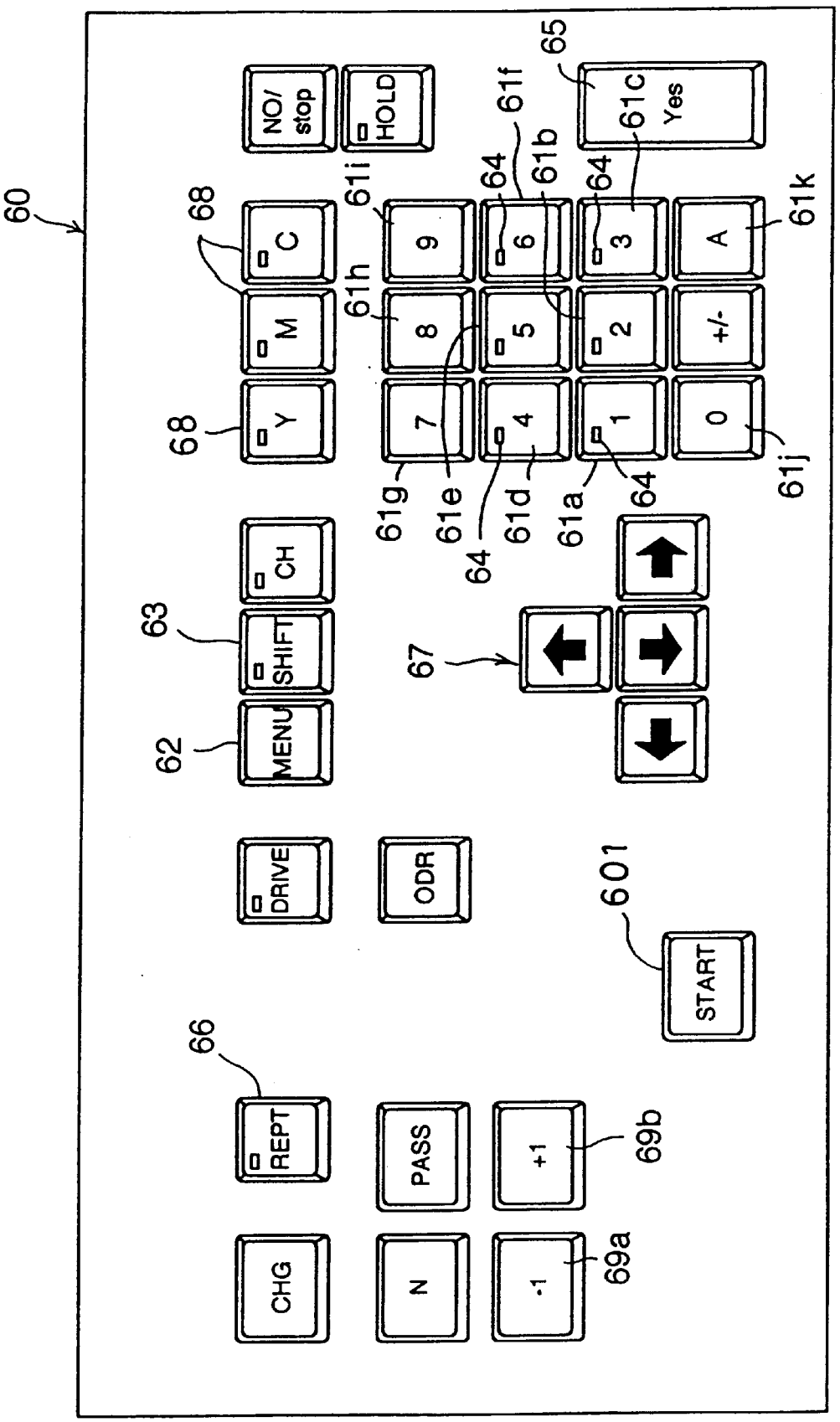
FIG. 9 is a plan view of a keyboard.

FIG. 9 shows a plan view of the keyboard 60. The output signals from the keyboard 60 are transmitted to the central control unit 5a through the keyboard control unit 80 acting as a keyboard interface. While the keyboard 60 includes various keys for controlling the photographic printing apparatus 1, only the keys relating to this invention will be described herein.

The keyboard 60 includes ten keys, i.e. a "1" key 61a, a "2" key 61b, a "3" key 61c, a "4" key 61d, a "5" key 61e, a "6" key 61f, a "7" key 61g, an "8" key 61h, a "9" key 61i and a "0" key 61j, arranged in a usual way in a rightward region thereof An "A" key 61k is disposed under the "3" key 61c. A "MENU" key 62 and a "SHIFT" key 63 are arranged in an upper central region of the keyboard 60.

For switching to the multiple frame display patterns, the "MENU" key 62 is pressed to display a menu screen on the monitor 50, and then the desired multiple frame display pattern is selected. As an alternative to the menu mode, a command mode based on key input may be employed of course.

Each of the "1" key 61*a* to "6" key 61*f* has an LED 64 mounted in an upper left position on a touch surface thereof to act as an identifying device. In the four-frame display pattern shown in FIG. 5, for example, the LEDs 64 of "1" key 61*a*, "2" key 61*b*, "4" key 61*d* and "5" key 61*e* are lit to indicate that only these keys are used to select the four simulated image frames 51 displayed on the monitor 50. That is, when the "1" key 61*a* is pressed, the cursor 54 moves to the simulated image frame 51 located in the lower left position in FIG. 5, to select this simulated image frame 51. Similarly, the simulated image frame 51 in the lower right position in FIG. 5 is selected by pressing the "2" key 61*b*. The simulated image frame 51 in the upper left position in FIG. 5 is selected by pressing the "4" key 61*d*. The simulated image frame 51 in the upper right position in FIG. 5 is selected by pressing the "5" key 61*e*. Thus, the "1" key 61*a*, "2" key 61*b*, "4" key 61d and "5" key 61*e* acting as selector keys are in a corresponding arrangement to the four simulated image frames 51 shown in FIG. 5, to enable a smooth selecting operation. In the six-frame display pattern shown in FIG. 6, the LEDs 64 of "1" key 61*a*, "2" key 61*b*, "3" key 61*c*, "4" key 61*d*, "5" key 61*e* and "6" key 61*f* are lit to indicate that only these keys are used to select the six simulated image frames 51 displayed on the monitor 50. In this case also, the arrangement of the six simulated image frames 51 displayed on the monitor 50 corresponds to the arrangement of the selector keys. When displaying the four-frame display pattern or six-frame display pattern in the menu mode, the LEDs 64 of the keys used to select simulated image frames 51 are lit by a selector key control device 81 included in the keyboard control unit 80.

In the 28-frame display pattern and 40-frame display pattern called multiple display patterns, the ten keys cannot be in a one-to-one relationship to the simulated image frames 51 displayed on the monitor 50. Therefore, a method is employed in which an image frame selection is established by pressing a particular key after a frame number is inputted with the ten keys. For selecting a simulated image frame 51 of frame number 13, for example, the "1" key 61*a* and "3" key 61*c* are first pressed, and then a "YES" key 65 disposed to the right of the ten keys is pressed, to establish input of "13". As a result, the controller 5 recognizes that the simulated image frame 51 of frame number 13 has been selected.

The ten keys are used to input various data in addition to selecting the simulated image frames 51 described above. By pressing the "SHIFT" key 63, for example, the LEDs 64 are turned off and the ten keys perform predetermined tasks as function keys. By pressing a "REPT" key 66 disposed in a leftward region of the keyboard 60, the LEDs 64 is turned off and the ten keys function as mere numeric keys. Thus, the "SHIFT" key 63 and "REPT" key 66 function as allocation canceling keys for canceling the frame image selecting function assigned to the ten keys. The keyboard 60 further includes four arrow keys 67 arranged in a lower central region thereof for inputting different directions for moving the cursor 54, as in conventional practice, to each simulated image frame 51 to be selected. For the simulated image frame 51 selected, a correction of exposing conditions is inputted along with the number of prints to be made, by operating the ten keys. For this purpose, color designating keys 68 including a "Y" key, an "M" key and a "C" key for the respective colors Y, M and C are arranged above the ten keys. In a leftward region on the keyboard 60 are a "–1" key 69*a* for decrementing a correction value, and a "+1" key 69*b* for incrementing the correction value. A "START" key 601 is used to start a printing process of film 2 for which the simulated image frames 51 displayed on the monitor 50 have been renewed and checked for a necessity of correction.

Four typical embodiments are proposed hereunder as sequences in the manual processing mode for performing an examination of simulated image frames 51.

Figure 10:
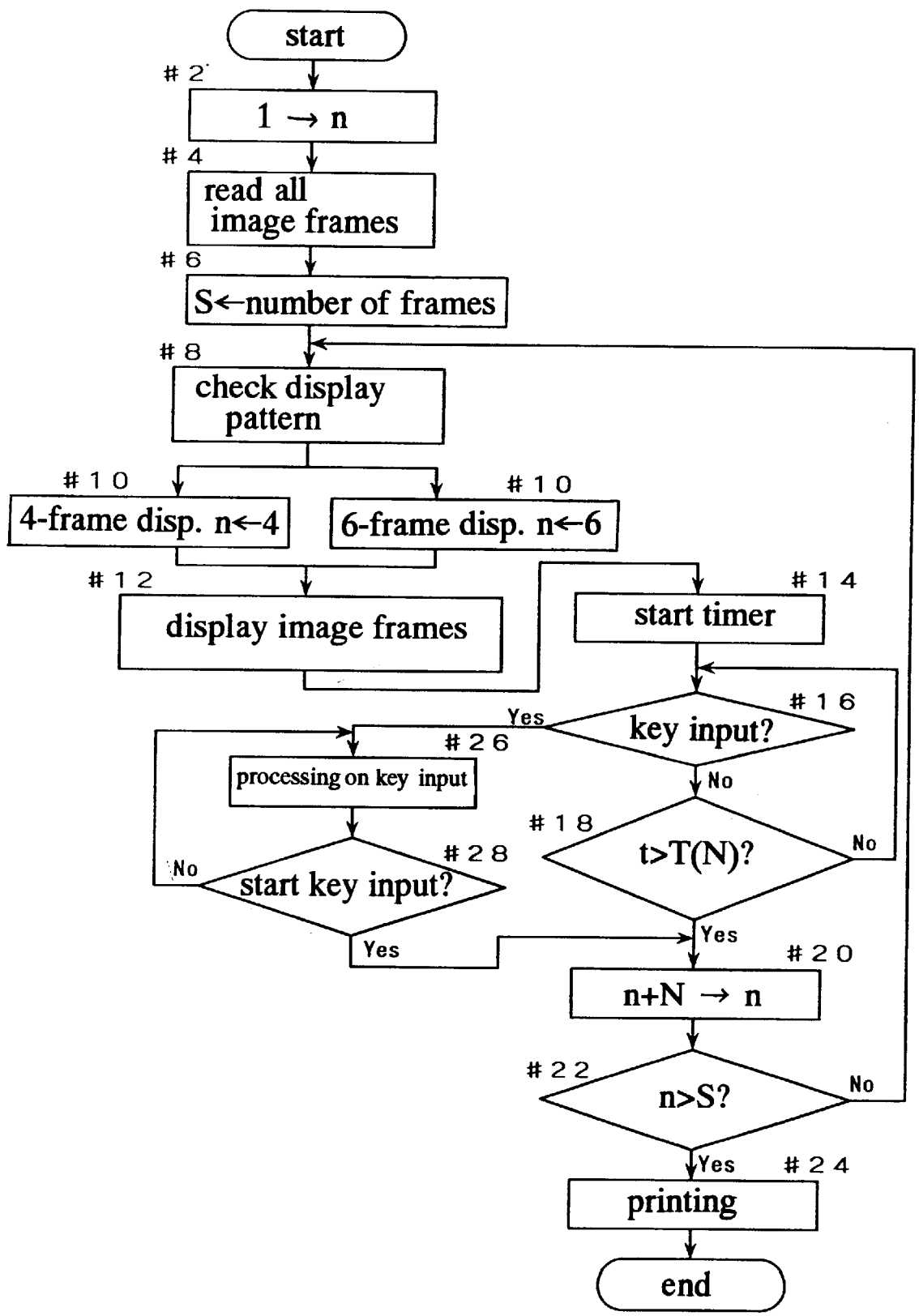
FIG. 10 is a flowchart of a simulated image selecting sequence in a first embodiment.

The first embodiment will be described with reference to the flowchart shown in FIG. 10.

By way of initialization, 1 is substituted for variable n (#2). All image frames are read with the film reader 21 from the film 2 being processed (#4). The number of image frames on this film 2 is substituted for variable S (#6). The multiple-frame display pattern currently selected is confirmed (#8). If the four-frame display pattern is selected, for example, 4 is substituted for variable N. If the six-frame display pattern is selected, 6 is substituted for variable N (#8). That is, the number of simulated image frames 51 simultaneously displayed on the monitor 50 is substituted for variable N. It is assumed here that the four-frame display pattern is selected.

Next, nth to (n+N−1)th, i.e. (n+3)th, simulated image frames 51 are displayed on the monitor 50 in the four-frame display pattern, and in the order corresponding to the image frames on the film 2 (#12). Then, the timer 5*f* is started (#14). The expiring time of this timer 5*f* is function: T(N) of variable N, i.e. the number of simulated image frames 51 simultaneously displayed on the monitor 50. The expiring time may be four seconds for the four-frame display pattern, and six seconds for the six-frame display pattern, for example.

After displaying the simulated image frames 51 on the monitor 50, checking is made whether the operator has made some key input from the keyboard 60 (#16). This key input checking is done until expiration of the timer 5*f* (#18). In this case, if the operator makes no key input within four seconds after the simulated image frames 51 are displayed, it is determined that the operator approves the simulated image frame 51 displayed. Then, preparations are started for displaying next simulated image frames 51. That is, (n+N) is substituted for variable n (#20). Unless the value of updated variable n exceeds the value of variable S (#22), simulated image frames 51 remain to be displayed, and the operation returns to step #8. If the value of updated variable n exceeds the value of variable S (#22), all the frames have been examined, and the film 2 is passed on to a printing process (#24).

If the checking step (#16) finds some key input made by the operator, a process of correcting exposing conditions, for example, is carried out based on the keys operated (#26). When the necessary process based on the key input is completed, the "START" key 601 is pressed to depart from the key input processing routine (#28). Preparations are started for displaying next simulated image frames 51.

Figure 11:
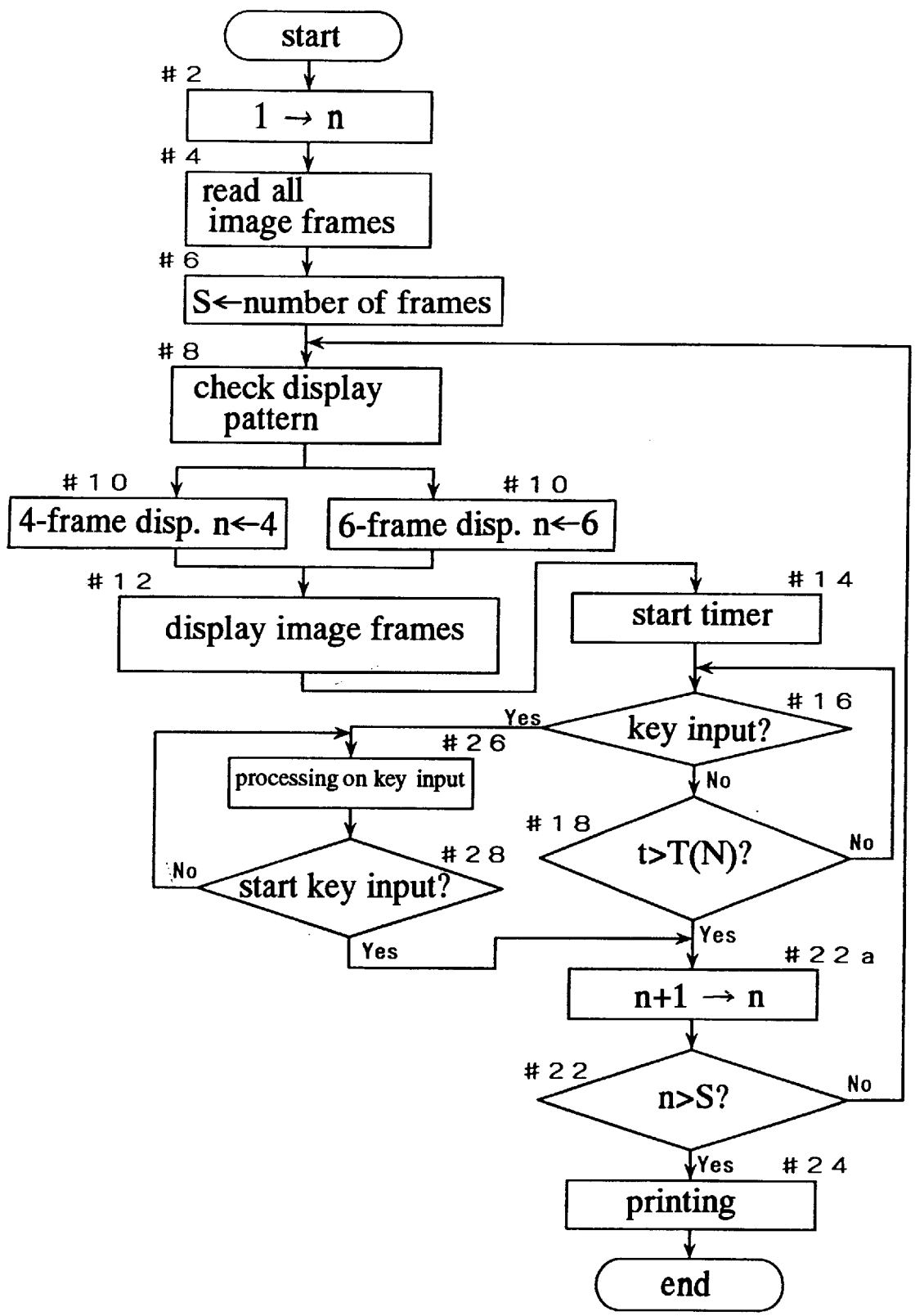
FIG. 11 is a flowchart of a simulated image selecting sequence in a second embodiment.

The second embodiment will be described next with reference to FIG. 11. In the first embodiment shown in the flowchart of FIG. 10, the simulated image frames 51 are renewed by rewriting, at a time, all the simulated image frames 51 displayed, in what is known as a page change mode. The second embodiment employs a horizontal or vertical scroll mode in which the simulated image frames 51 are moved to disappear at one end of the screen, and new simulated image frames 51 are made to appear at the opposite end. This embodiment is illustrated in the flowchart of FIG. 11. In FIG. 10, (n+N) is substituted for variable n at step #20. This embodiment is different only in substituting (n+1) for variable n (#22*a* ). It is of course desirable to reduce the expiring time of the timer.

Figure 12:
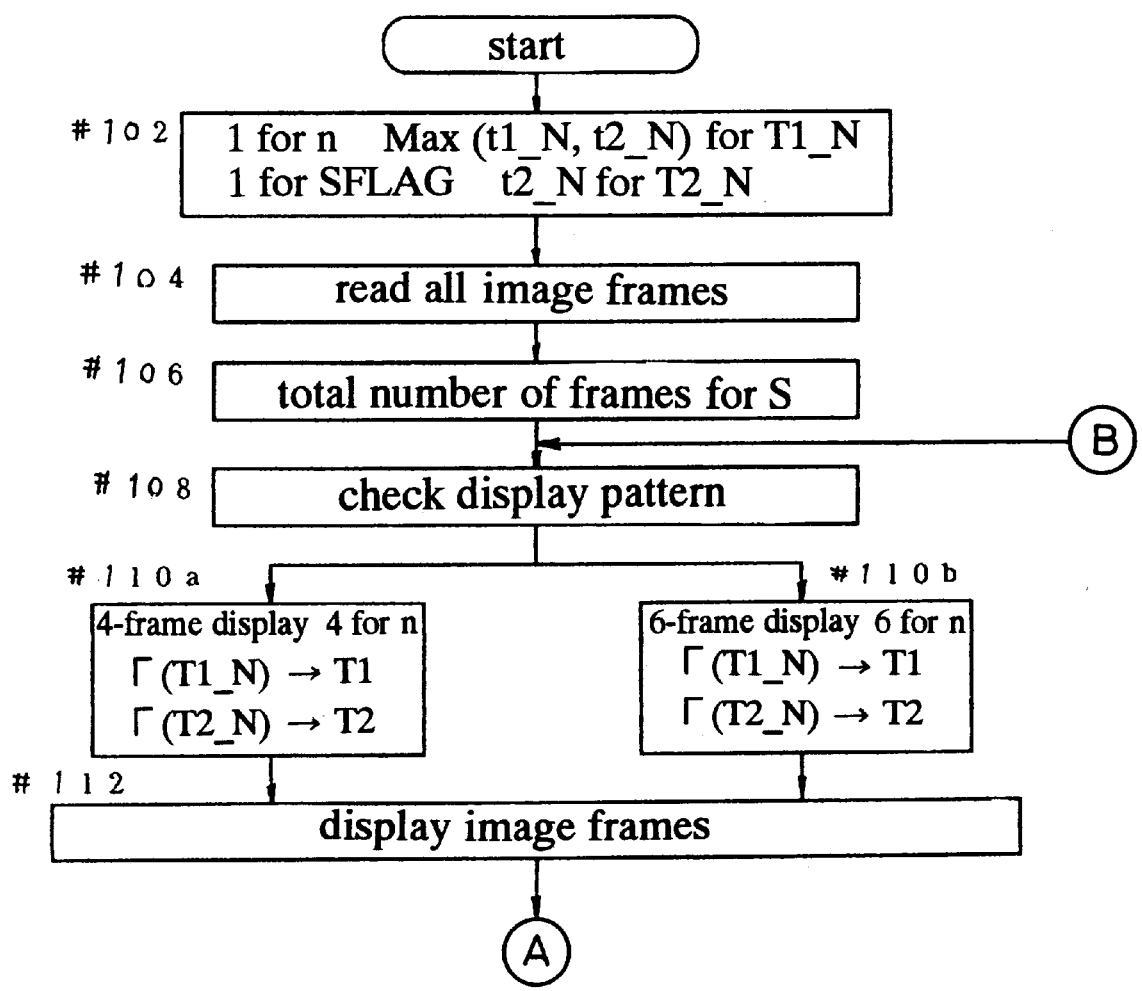
FIG. 12 is a first-half flowchart of a simulated image selecting sequence in a third embodiment.
Figure 13:
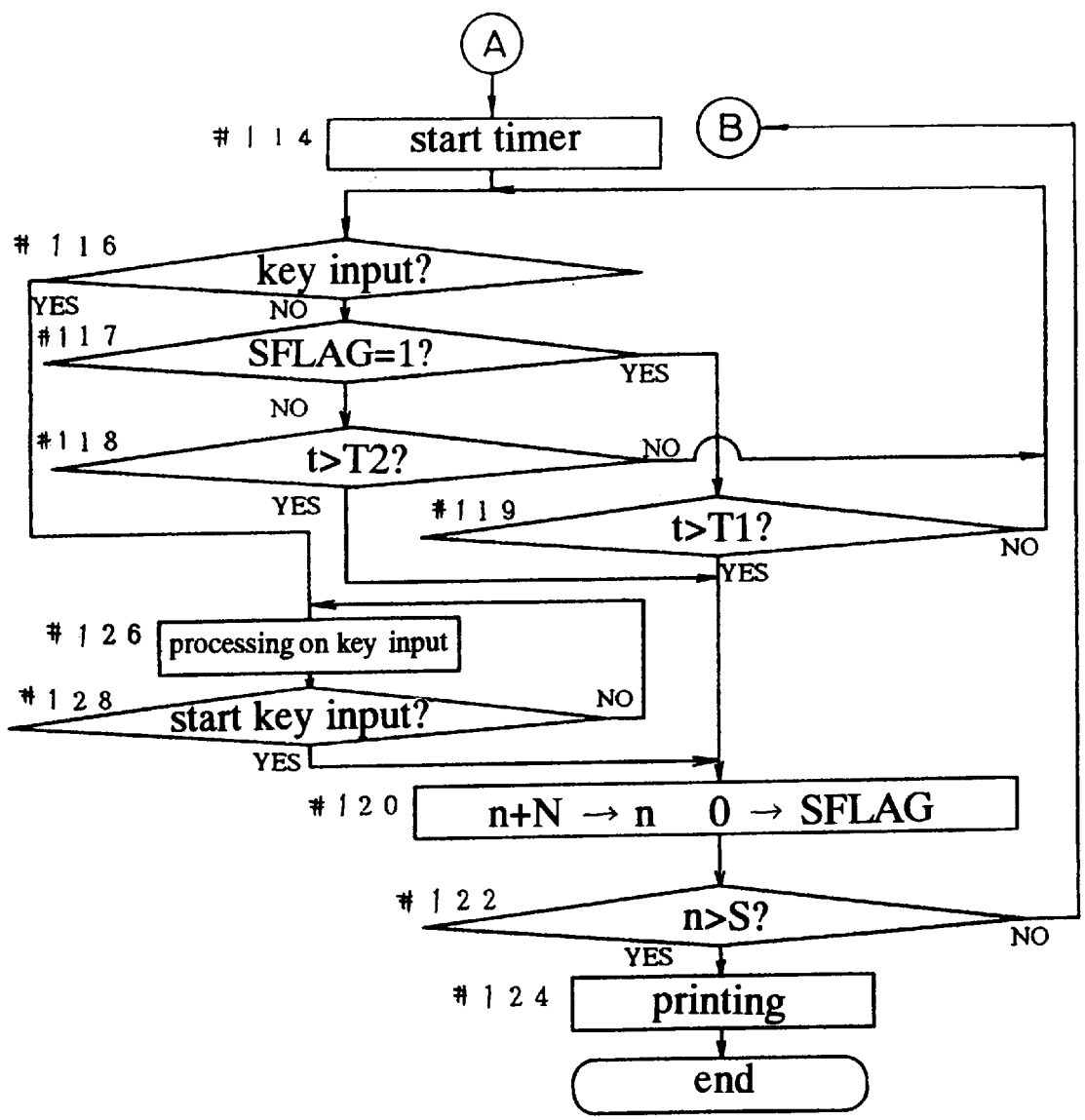
FIG. 13 is a second-half flowchart of the simulated image frame selecting sequence in the third embodiment.

The third embodiment will be described next with reference to the flowcharts shown in FIGS. 12 and 13.

It is assumed here that the operator sets, through the keyboard 60, a first predetermined time: t1_N which is a period of time before rewriting the first monitor screen presenting simulated image frames in one order, and a second predetermined time: t2_N which is a period of time before rewriting a subsequent monitor screen. In this case, t1_N indicates that the first predetermined time is t1 second based on an N-frame display pattern, and t2_N indicates that the second predetermined time is t2 second based on the N-frame display pattern.

First, an initialization is effected at step 102 (#102) to substitute 1 for variable n, and substitute 1 for SFLAG which is a flag indicating a start of order change. Further, the longer of the first predetermined time: t1_N and the second predetermined time: t2_N is substituted for T1_N which is a variable representing the first predetermined time (here again, _N indicates that the N-frame display pattern is used as the basis). The second predetermined time: t2_N is substituted as it is for T2_N which is a variable representing the second predetermined time. The above operation is made in order to avoid a contradiction that the second predetermined time becomes longer than the first predetermined time.

All image frames are read with the film reader 21 from the film 2 being processed (#104). The number of image frames on this film 2 is substituted for variable S (#106). The multiple-frame display pattern currently selected is confirmed (#108). If the four-frame display pattern is selected, for example, 4 is substituted for variable N. The first predetermined time and second predetermined time are adjusted, as necessary, according to the number of frames displayed. This adjustment is made by referring to a table set beforehand. This operation may be expressed as follows:

$$T1 \leftarrow \Gamma(T1\_N)$$

$$T2 \leftarrow \Gamma(T2\_N)$$

where $\Gamma$ is a function for computing a first and second A predetermined times from the number of displayed frames providing the basis for inputting the first and second predetermined times, and the number of displayed frames selected here. Where, for example, one second is inputted based on the four-frame display pattern, the six-frame display pattern results in a longer time. This function is derived empirically and set to the controller 5. As a result, the final first and second predetermined times are substituted for variables: T1 and T2 (#110*a*). Similarly, if the six-frame display pattern is selected, 6 is substituted for variable: N, and the final first and second predetermined times are substituted for variables: T1 and T2 (#110*b*). Variable: N is the number of simulated image frames 51 simultaneously displayed on the monitor 50. If the four-frame display pattern is selected, step 110*a* (#110*a*) is executed.

Next, nth to (n+N−1)th, i.e. (n+3)th, simulated image frames 51 are displayed on the monitor 50 in the four-frame display pattern, and in the order corresponding to the image frames on the film 2 (#112). Then, the timer 5*f* is started (#114). The expiring times of this timer 5*f* are the final first predetermined time: T1 and final second predetermined time: T2. For the four-frame display pattern, the first predetermined time: T1 is 1.5 seconds, and the second predetermined time: T2 is one second.

After displaying the simulated image frames 51 on the monitor 50, checking is made whether the operator has made some key input from the keyboard 60 (#116). This key input checking is done until expiration of the timer 5*f* (#118). Where 1 is set to SFLAG indicating a start of order change, the first screen is displayed and "yes" results from step 117 (#117). The first predetermined time: T1 is used as the expiring time of timer 5*f* (#119). When the checking of the first screen is completed, zero is substituted for SFLAG (#120). Consequently, for screens other than the first screen, "No" results from step 117 (#117), and the second predetermined time: T2 is used as the expiring time of timer 5*f* (#118).

If the checking step (#116) finds some key input made by the operator, a process of correcting exposing conditions, for example, is carried out based on the keys operated (#126). When the necessary process based on the key input is completed, the "START" key 601 is pressed to depart from the key input processing routine (#128).

When the timer 5*f* expires or the process based on the key input is completed, zero is substituted for SFLAG and (n+N) is substituted for variable n (#120). Unless the value of updated variable n exceeds the value of variable S (#122), simulated image frames 51 remain to be displayed, and the operation returns to step #108. If the value of updated variable n exceeds the value of variable S (#122), all the frames have been examined, and the film 2 is passed on to a printing process (#124).

Figure 14:
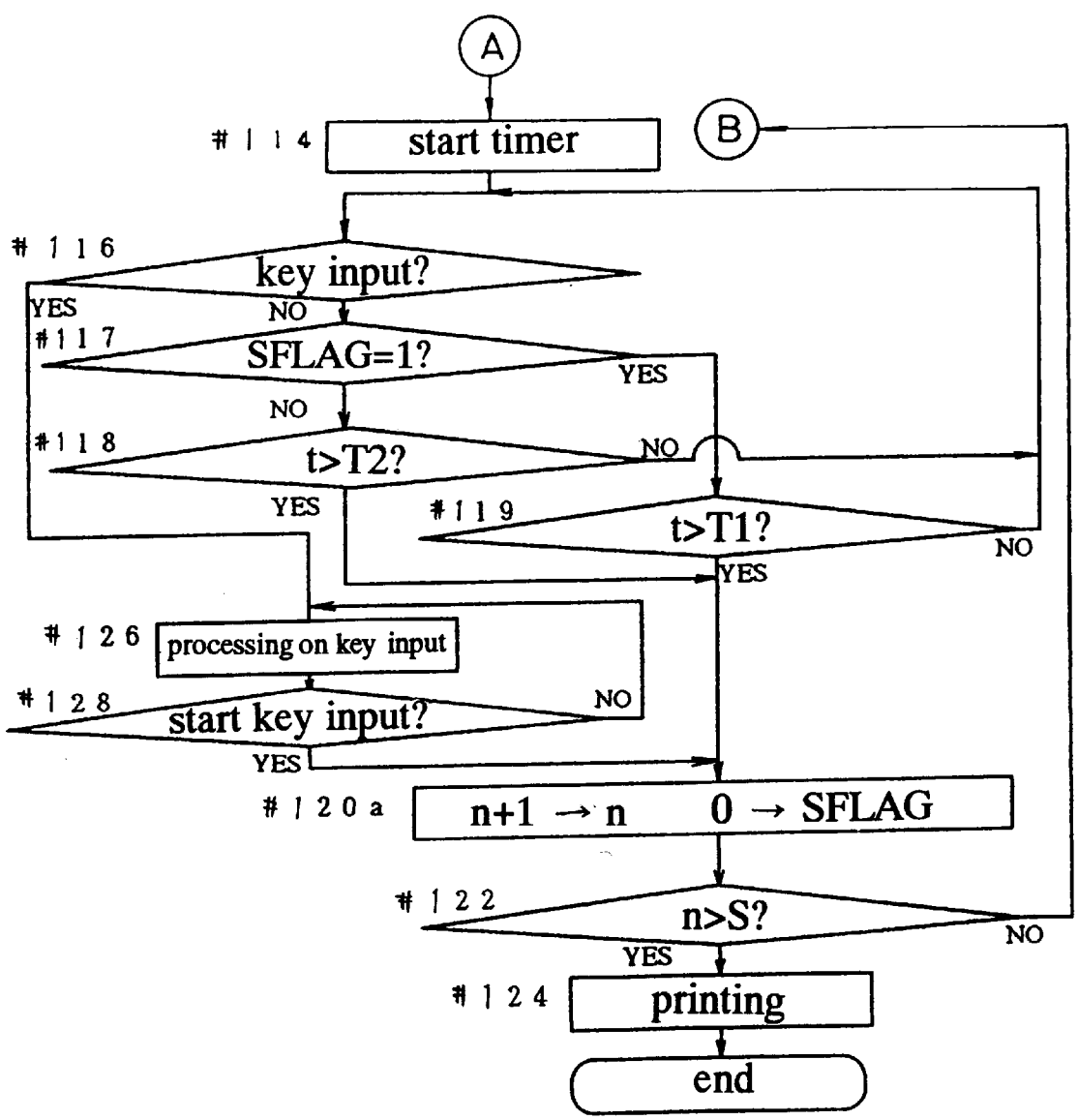
FIG. 14 is a second-half flowchart of a simulated image selecting sequence in a fourth embodiment.

The fourth embodiment will be described next with reference to the flow charts shown in FIGS. 12 and 14. While the third embodiment employs the page change mode, the fourth embodiment employs the horizontal or vertical scroll mode. The first half of the flowchart of the third embodiment shown in FIG. 12 may be used to describe the fourth embodiment. In the third embodiment, (n+N) is substituted for variable n at step #120. As seen from FIG. 14, this embodiment is different only in substituting (n+1) for variable n (#120*a*). Of course, the expiring time of the timer is reduced here.

The four embodiments have been described separately hereinbefore. The system may be constructed to employ a selected one of these embodiments. The controls may be effected based on any one of the above embodiments according to a selected rewriting mode. It is also possible to employ a combination of the features of the four embodiments as appropriate.

In all of the embodiments described above, a printing process is performed after examination of all the image frames on the film 2 in one order. Alternatively, as simulated image frames 51 disappear from the monitor 50 after an examination, the film 2 may be transported for successive printing of the examined image frames the printing paper 3.

In the embodiment described herein, the four-frame display pattern and six-frame display pattern are employed to exemplify the multiple-frame display patterns. The other display patterns may be used instead. It is possible other keys than the ten keys as the selector keys.

What is claimed is:

1. A photographic printing apparatus having an exposing station for exposing printing paper, said apparatus comprising:
   an image information memory for storing image data read from image frames on one developed photographic film;
   an exposing condition computing unit for deriving exposing conditions from the image data stored in said image information memory;
   an exposure control unit for controlling said exposing station based on said exposing conditions;
   an image information converter for converting said image data read from said image information memory into simulated image data based on said exposing conditions derived by said exposing condition computing unit, and for successively displaying said simulated image data, as a plurality of simulated image frames, in a particular multiple frame display pattern on a monitor screen, said particular multiple frame display pattern being selected from a plurality of multiple frame display patterns;

a timer for starting to measure a predetermined time upon display of said plurality of simulated image frames on said monitor screen;

input means for inputting exposing-condition connection commands to manipulate said simulated image frames displayed on said monitor screen; and screen display change means for resetting said timer when said exposing condition correction commands are inputted through said input means and for switching said monitor screen to a view including next simulated image frames unless said exposing condition correction commands are inputted through said input means within said predetermined time measured by said timer, wherein said predetermined time includes a first predetermined time effective for a first monitor screen view displaying said simulated image frames obtained from one developed photographic film, and a second predetermined time effective for monitor screen views displaying the remaining simulated image frames which were not displayed on said first monitor screen, said first predetermined time and said second predetermined time being independently settable.

2. The photographic printing apparatus of claim 1, wherein said first predetermined time is set longer than said second predetermined time.

3. The photographic printing apparatus of claim 1, wherein said screen display change means automatically adjusts said first predetermined time and said second predetermined time according to the number of displayed frames included in one of said plurality of multiple frame display patterns selected at said time information converter.

4. The photographic printing apparatus of claim 1, wherein said predetermined time is variable according to a skill level of an operator.

5. The photographic printing apparatus of claim 1, wherein said input means includes a plurality of selector keys arranged in a corresponding relationship to an arrangement of said simulated image frames displayed in said multiple frame display pattern on said monitor screen, a function for selecting said simulated image frames displayed on said monitor screen being assigned only to said selector keys corresponding to said arrangement of said simulated image frames in said multiple frame display pattern.

* * * * *

UNITED STATES PATENT AND TRADEMARK OFFICE
CERTIFICATE OF CORRECTION

PATENT NO. : 6,233,037 B1  
DATED : May 15, 2001  
INVENTOR(S) : Ueda et al.

Page 1 of 1

It is certified that error appears in the above-identified patent and that said Letters Patent is hereby corrected as shown below:

Column 8,
Line 59, after "thereof" insert -- . --.

Column 11,
Line 38, delete -- A --.

Signed and Sealed this

Eleventh Day of December, 2001

Attest:

NICHOLAS P. GODICI
*Acting Director of the United States Patent and Trademark Office*

*Attesting Officer*